(12) United States Patent
Zabala et al.

(10) Patent No.: US 6,418,804 B1
(45) Date of Patent: Jul. 16, 2002

(54) FLUID FLOW INSPECTION AND VIDEO RECORDING SYSTEM AND METHOD FOR TURBINE BUCKETS

(75) Inventors: Robert J. Zabala, Schenectady; Bruce A. Knudsen, Amsterdam; Ernest G. Cusick, Clifton Park, all of NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/735,633

(22) Filed: Dec. 14, 2000

(51) Int. Cl.[7] .......................... G01N 19/00; G06F 11/00
(52) U.S. Cl. .................... 73/865.9; 73/37; 73/865.8; 702/188; 348/83
(58) Field of Search ......................... 73/865.9, 865.8, 73/432.1, 37, 49.7, 866.3; 702/188; 340/606, 607; 250/573; 348/83, 125

(56) References Cited

U.S. PATENT DOCUMENTS

| | | | |
|---|---|---|---|
| 3,478,580 A | * 11/1969 | Siemietkowski et al. | 73/119 A |
| 4,675,728 A | * 6/1987 | Egger et al. | 250/302 |
| 4,682,491 A | * 7/1987 | Pickard | 73/168 |
| 5,686,989 A | * 11/1997 | Hoffman et al. | 356/336 |
| 6,002,995 A | * 12/1999 | Suzuki et al. | 348/143 |

FOREIGN PATENT DOCUMENTS

JP 01320445 A * 12/1989 ............... 73/37

OTHER PUBLICATIONS

JP–63132108–A, English language abstract. Dec. 1989.*

* cited by examiner

Primary Examiner—Hezron Williams
Assistant Examiner—Michael Cygan
(74) Attorney, Agent, or Firm—Banner & Witcoff, Ltd.

(57) ABSTRACT

An inspection and recording system for fluid flow testing of cooling passageways in gas turbine buckets provides readily observable visual determination of whether any blockages were formed during the manufacturing or refurbishing processes. The inspection apparatus includes a manifold block and manifold control valve mounted on a platform and adapted to engage the root end of a turbine bucket and supply liquid therethrough. The liquid exiting at the tip of the turbine bucket is visible and any blockages in the passageways will be easily discerned by the absence or paucity of liquid flow at the tip. The fluid flow test is recorded with at least one video camera to display both locally and possibly remotely the fluid flow through the article. The video images can be displayed remotely in real time over a computer network or can be stored on a suitable medium for time delayed display. When the system is connected to a computer network, a remote viewer can also provide input or comment on the inspection displayed.

38 Claims, 5 Drawing Sheets

FLUID FLOW INSPECTION AND VIDEO RECORDING SYSTEM AND METHOD FOR TURBINE BUCKETS

BACKGROUND OF THE INVENTION

In order to improve the performance of gas turbines, higher operating temperatures are required. These higher temperatures require supplemental cooling of the bucket via radial and serpentine cooling passageways in the buckets. Air cooled gas turbine buckets are typically cooled by bringing compressor discharge air into the wheel and channeling the air into dovetail slots between the wheel and turbine buckets through the entrance apertures of the cooling passageways.

For optimal turbine performance, it is important for these passageways to be free and clear of any blockage in order to meet minimum air flow requirements. When turbine buckets are manufactured or used buckets refurbished, the processing steps can include any number of methods such as grit blasting, shot blasting and aqua polishing which make is possible to introduce foreign matter into the cooling passageways. If there is a sufficient quantity of foreign matter, the passageways can become blocked which reduces the performance of the machine. To determine whether there is a blockage, the conventional inspection process is to subject the bucket to an air flow test in which air is supplied through the passageway from an inlet to an outlet. In most cases multiple passageways of a bucket are tested simultaneously. The air flow test has proven to be unreliable especially in multiple hole flow tests as it is possible to pass the air flow test with blocked passageways.

In order to ensure that buckets with blocked passageways are not inadvertently shipped, additional measures are sometimes required such as pulling string or cord through the passageways to demonstrate that the passageways are clear. Inserting the string into the cooling passageways adds to the cost of the buckets.

A more reliable and efficient way of inspecting the cooling passages for blockages is needed as well as a process for documenting such an inspection.

BRIEF SUMMARY OF THE INVENTION

To address the reliability issues of the conventional air flow test, the present invention employs a fluid, such as a liquid, for example, water, flow inspection apparatus and process for gas turbine buckets. With water flow inspection, the flow of water through each of the cooling passageways is visible, and can be documented by recording the exit of water from the bucket on a video medium. The video recording can be archived or used to obtain approval or comment from customers remotely. The water flow inspection process employs a water flow inspection apparatus which includes a bench or platform having a manifold block affixed to the bench. The manifold is supplied by a pressure regulated water supply line controlled by a valve and equipped with a flow meter. The water flow inspection apparatus also includes a pressure regulated air supply line in communication with the manifold for clearing the cooling passages of any residual water from the water flow test.

To conduct a water flow inspection, a turbine bucket is affixed to the bench with its root or base in communication with and sealed to the manifold block. The tip of the bucket extends toward an area where water can be sprayed. The water supply line valve is opened to allow water to flow through the cooling passages of the bucket. At the tip, the water exiting each cooling passage of the bucket is clearly visible. If any passage is blocked, it would be readily visible by the water flow test. Overall water flow through the cooling passages can be read from the flow meter, and this reading compared against a calculated overall minimum flow.

The inspection system includes vertical supports mounted to the bench and linked together by a horizontal support. The components of the inspection apparatus are mounted to the supports or the bench.

The inspection system also includes components to provide documentation of the test for supplier and customer records. A number of compact video cameras are mounted to the inspection apparatus and aimed at critical observation areas. One camera is aimed at the serial number area of the turbine bucket affixed in its holder, a second camera is aimed in the tip area to observe water flow out of the tip, and a third camera is aimed at the flow meter. These video cameras are coupled to a video recorder so that the inspection can be documented by way of a video recording. Since the recording will include the serial number of the particular bucket being tested, the recording can be archived for record keeping purposes.

The video recording of the water flow inspection can also be displayed for a remote viewer on a computer network such as the internet in real time or time delay. Alternatively the video recording can be sent to a customer as a data file for downloading and review. The customer is then able to view the water flow inspection and provide approval or disapproval immediately via the internet or other communication media. Documentation of the flow test in this format is reliable, storable information for both a supplier's records and a customer's records.

DETAILED DESCRIPTION OF THE INVENTION

Figure 1:
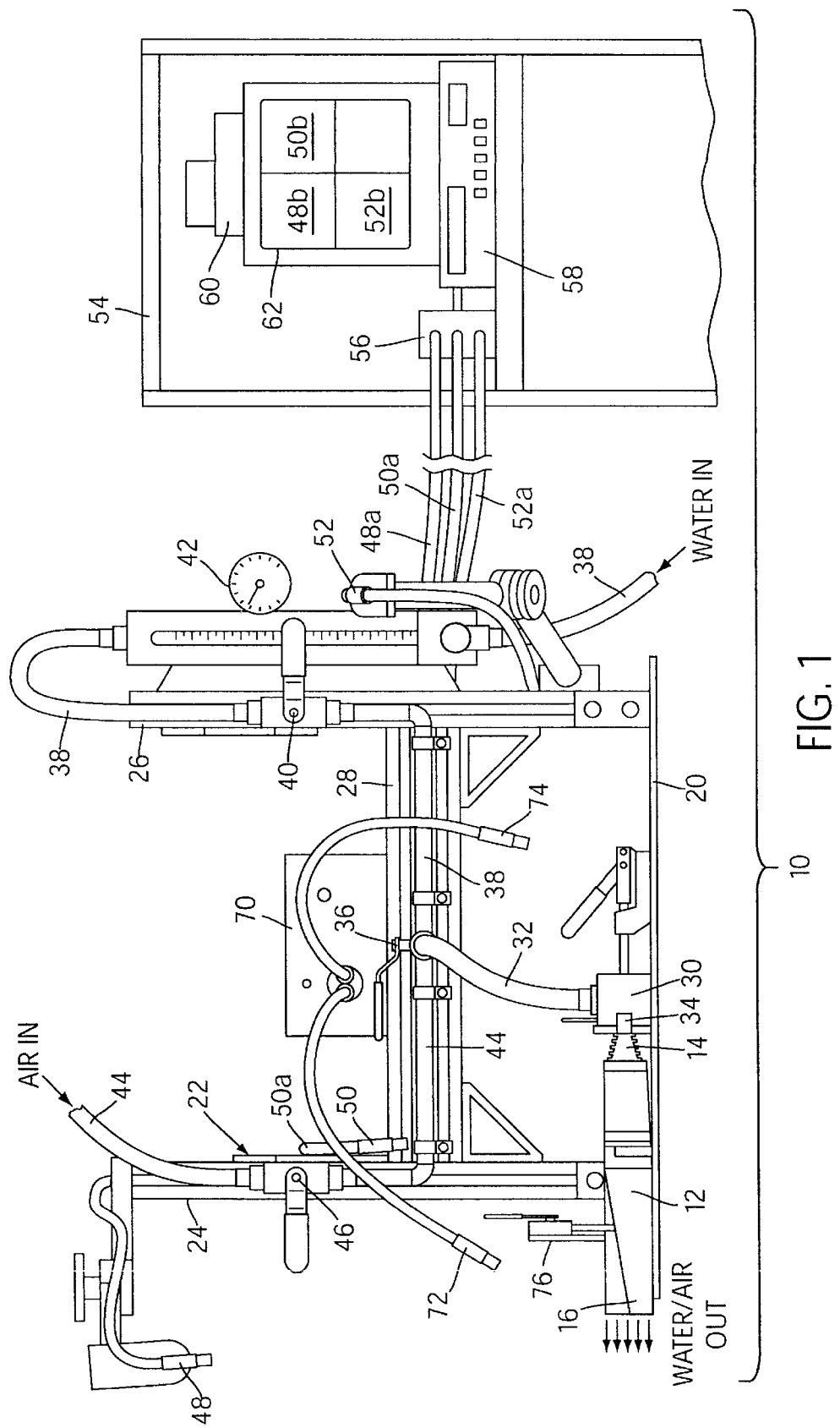
FIG. 1 is an elevational view of the overall inspection and video recording system.

The components of a fluid flow inspection and video system 10 are shown in FIG. 1 in elevation. A turbine bucket 12 having a dovetail or root end 14, a tip 16 and a plurality of passageways 18 of any desired configuration, is shown with the inspection and recording system for illustration purposes. The inspection apparatus portion includes a platform or bench 20 on which is mounted a support framework 22. Support framework 22 can include any number of supports in any orientation, and in the illustrated embodiment, includes a pair of vertical supports 24, 26 linked together by a horizontal support 28 which is generally parallel to bench 20. The invention is described herein with the fluid described as a liquid such as water. This description is merely exemplary and is not intended to limit the invention. Any fluid which is visible or made visible may be used.

Affixed to the planar surface of bench 20 is a manifold block 30 having an inlet 32, an outlet 34 and a manifold control valve 36. Manifold block 30 is disposed so that its outlet 34 can mate with and engage the dovetail or root end 14 of a turbine bucket 12 with the bucket in parallel relation to the bench. The outlet of the manifold block 30 is designed to seal against the dovetail end 14 of the bucket and supply fluid to some or all of the cooling passageways 18 of the bucket simultaneously. The manifold block is located on the bench so that when bucket 12 is clamped in place, its tip 16 extends over a free edge of the bench. At manifold control valve 36, inlet 32 of manifold block 30 is coupled to a pressure regulated water supply line 38 having a water control valve 40. A pressure regulator is connected to the water supply line upstream. A back flow prevention mechanism (not illustrated) can also be installed on the water supply line as well. At least a portion of water supply line 38 and a flow meter 42 are attached to support framework 22 for ready visual observation and ease of use.

Also at manifold control valve 36, a pressure regulated air supply line 44 is connected to inlet 32 of the manifold block. Air supply line 44 has an air control valve 46 and a pressure regulator associated with it. Air is supplied to the manifold to clear out residual water in the bucket passageways after a flow test is performed. At least a portion of air supply line 44 and its components are attached to support framework 22. In the illustrated embodiment, the water supply line and flow meter are attached to vertical support 26 of the support framework, while the air supply line is attached to vertical support 24.

The video display and recording portion of the system includes at least one and possibly multiple compact video cameras mounted on flexible, bendable cables and aimed at critical areas of the system. For example, video camera 48 on cable 48a is aimed toward the tip 16 of the bucket to record the flow of water out of the passageways. Video camera 50 on cable 50a is aimed toward the serial number marking on the test bucket 12. A third video camera 52 on cable 52a is aimed at water flow meter 42. A video cabinet 54 houses the other components of the video display and recording portion of the system.

There are a number of possibilities available with the video portion of the system. The system can be used to simply display the test images on a monitor, the images could be displayed over a computer network such as the internet in real time to a remote viewer, the test images could be recorded on a suitable recording medium and be stored for archival purposes or for time delayed review. Time delayed review may occur over the computer network or by transmission of the data files by other means. Any one or all of these uses are available with the system of the present invention.

Figure 2:
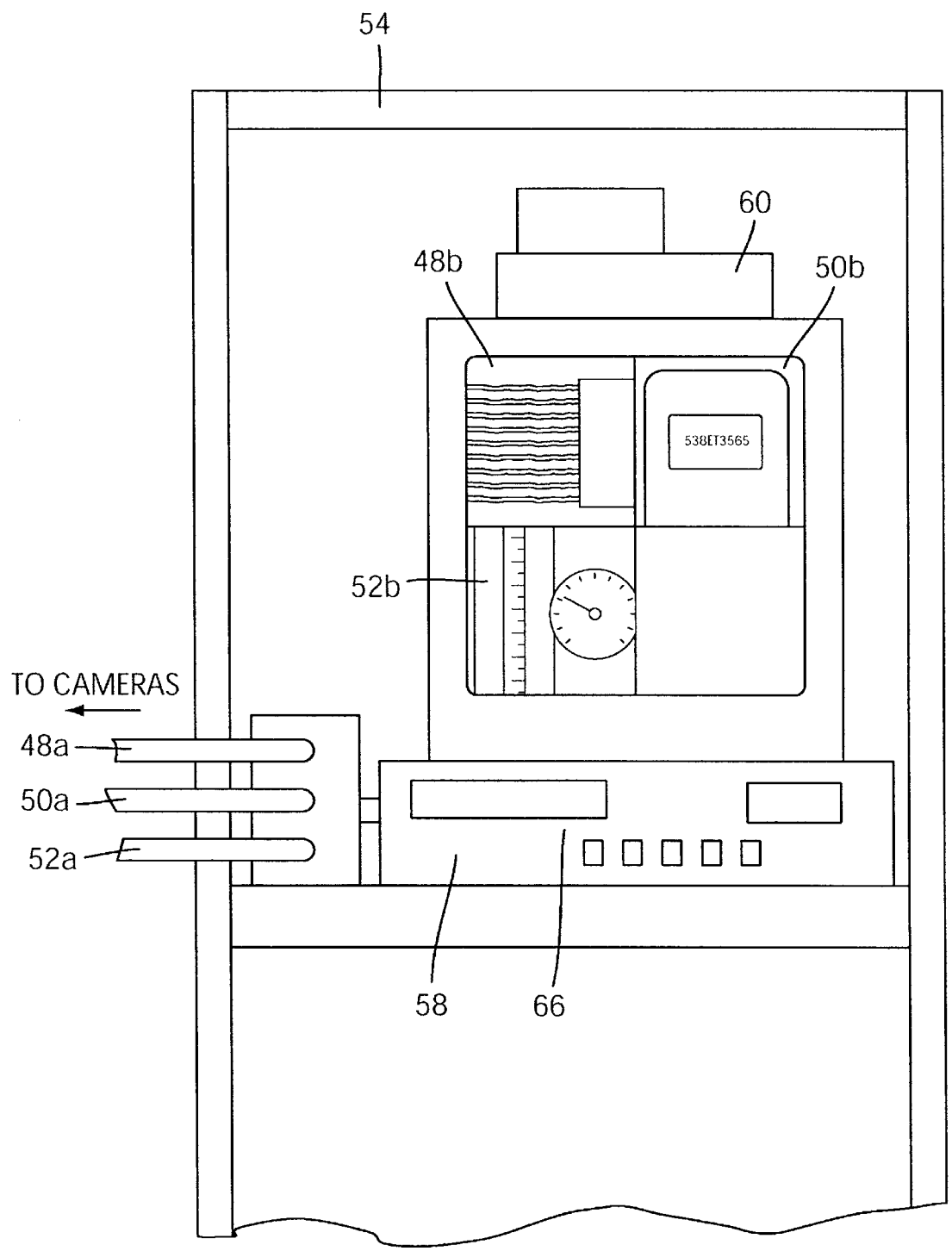
FIG. 2 is an elevational view of the monitor and recording device.
Figure 5:
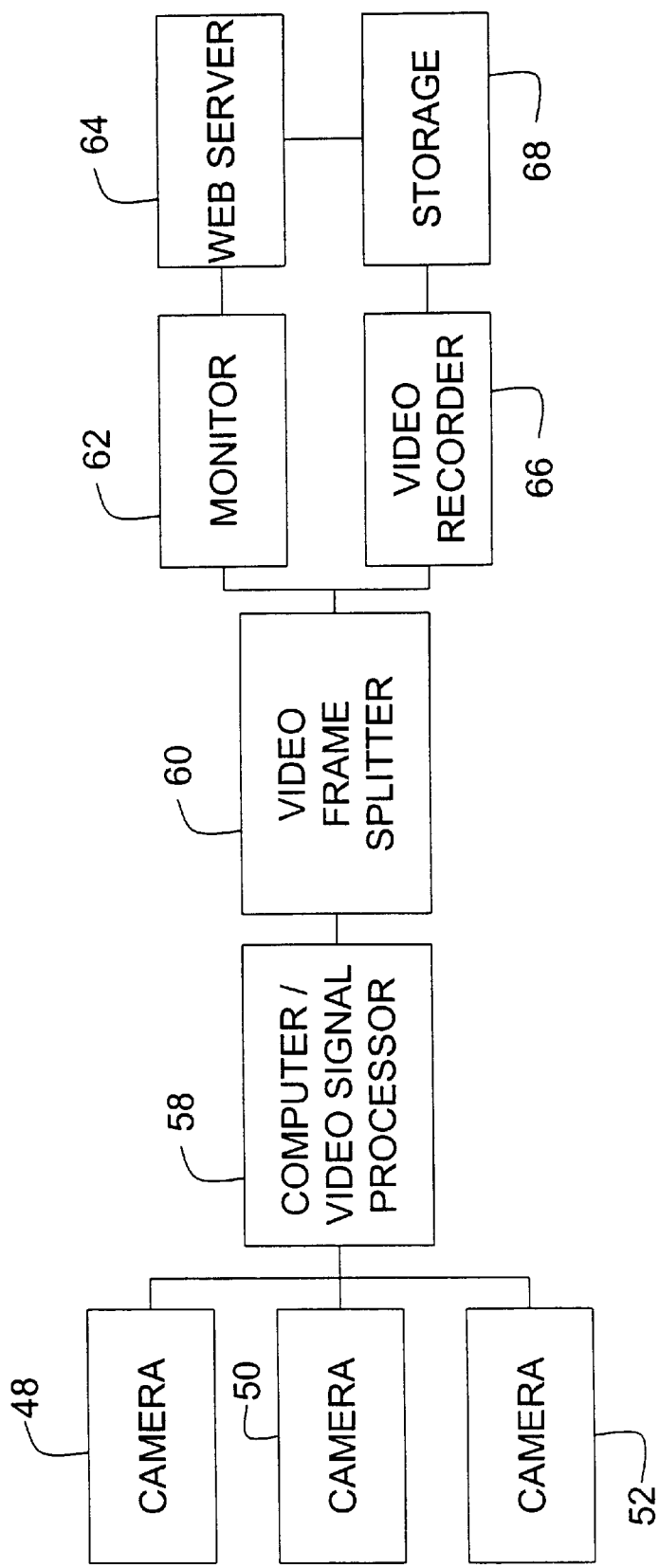
FIG. 5 is a block diagram of the video display and recording portion of the system.

Cables 48a, 50a and 52a run into a junction box 56 in video cabinet 54 which connects the cameras to their respective power supplies and a computer 58 containing a video signal processor, FIGS. 2 and 5. A video frame splitter 60 is provided in the computer or is separate from the computer and linked into the system. The video frame splitter enables images from multiple cameras to be displayed on a single monitor 62. In the figures, the computer 58 and a recording device such as a VCR are shown schematically as a single component, but of course separate components can be linked together. In the illustrated embodiment, the monitor has four quadrants, and images from the three cameras are displayed in three of the quadrants with a fourth quadrant left empty. As shown schematically in FIG. 2, quadrant 48b displays the image from camera 48 of the tip area of the bucket, quadrant 50b displays the image from camera 50 of the serial number of the bucket, and quadrant 52b displays the image from camera 52 of the water flow meter. In this manner, the critical test regions are displayed on a monitor.

The video images can be transmitted to a remote viewer on a computer network. A computer network is used throughout this specification to refer to two or more computers connected together by cable, a server, a modem or other connection means. Examples of such computer networks include local area networks, wide area networks, distributed networks, the internet or other configuration of networked serves. The video images can be transmitted or displayed such that they can be viewed by anyone remote from the inspection site but having a computer connected to the network.

One way to make the displayed images available real time over a computer network such as the internet is to use webcams for the video cameras in the system. In the simplest webcam applications, the computer would be equipped with suitable software to grab a frame from the cameras periodically and convert the image to a normal JPG file. The JPG file is then uploaded to a web server 64 to post the image on a web page which can be accessed by viewers over the internet with proper authorization. The methods of automatically refreshing the image periodically employing meta tags to the HTML for the page, a Javascript function or a Java applet, are known, and very useful in this application. In more enhanced applications, the webcam can be used to process streaming video of the inspection process and display it on the web page.

The remote viewer may be a customer who is interested in viewing the inspection process for the turbine buckets as the testing occurs. The remote viewer would be provided with any security information they need to access the web page to view the images. The web page can be designed so that the remote viewer can provide real time input about the inspection process such as confirming approval and agreeing to take delivery.

One way to store the test images for time delayed viewing is to upload the webcam images or streaming video to a web page on the server and allow remote viewers to review the images at their convenience. The remote viewers can provide feed back about the inspection, and communicate approval over the internet, email, telephone or any other communication means.

In the applications in which the video is uploaded to a web server and accessible via the internet, it is understood that the remote viewer will need a computer with internet access and suitable player plug-in software to view the video.

Another way to store the test images is to connect the video cameras to a recorder 66 such as a video cassette recorder (VCR), digital video disk encoder, or the like. The storage medium 68 can be magnetic tapes as with VHS tapes, or digital media such as DVD or the like. The test images for a series of turbine buckets can be recorded, indexed and stored with the system of the present invention. The stored recordings can be made available for viewing over the internet by upload to the web server, or by transmission of the tape or disk itself. These stored recordings can be archived as sales records, used for warranty purposes, or sent to customers for viewing remotely.

The ability to obtain immediate, or near immediate, input from customers who view the videos of the inspection process over a computer network such as the internet will improve delivery times, reduce warranty questions and enhance customer satisfaction.

To facilitate the video recordings, at least one and possibly a number of light sources can also be aimed at the critical areas to better illuminate them for videography. One preferred type of auxiliary light source 70 is shown in FIG. 1 with a number of flexible, bendable cables having lights 72 and 74 mounted at their ends. These lights can be aimed wherever the cameras need supplemental light for high quality video display and recording. Any number of lights may be used as warranted by the video recording equipment.

The operation of the water flow inspection and video display and recording system will be explained with reference to the illustrated embodiment in which a 6B-Stage 1 bucket is tested with a system employing a video cassette recorder. It will be understood that the system can be easily configured to test any type of bucket, and other recording media may be employed.

Figure 3:
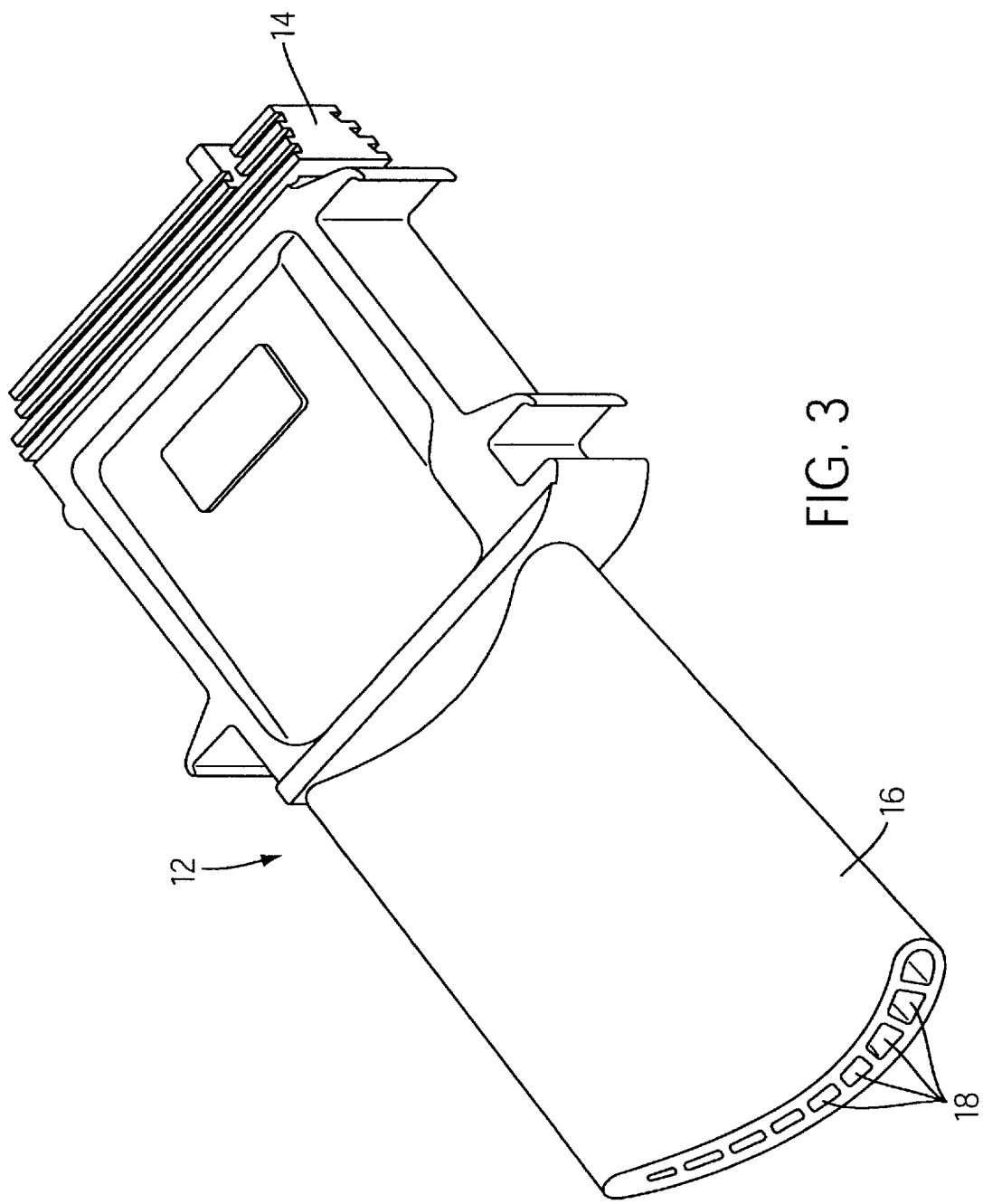
FIG. 3 is a perspective view of a turbine bucket to be inspected.

Before conducting a flow test which is to be displayed on monitor 62 and recorded, the air control valve and the water control valve are closed, and a tape inserted into the recorder 66. Vital information is noted in a logbook for a written record and includes the date, time, job number, serial number, tape counter, water pressure and flow. Then manifold control valve 36 is confirmed to be closed, and a turbine bucket 12, FIG. 3, to be tested is installed on bench 20 with a clamp 76, a holder or other suitable hardware, with its dovetail end 14 in communication with outlet 34 of manifold block 30. The dovetail end 14 of bucket 12 is sealed against the manifold outlet and the body of the bucket in generally parallel relation to the bench.

Figure 4:
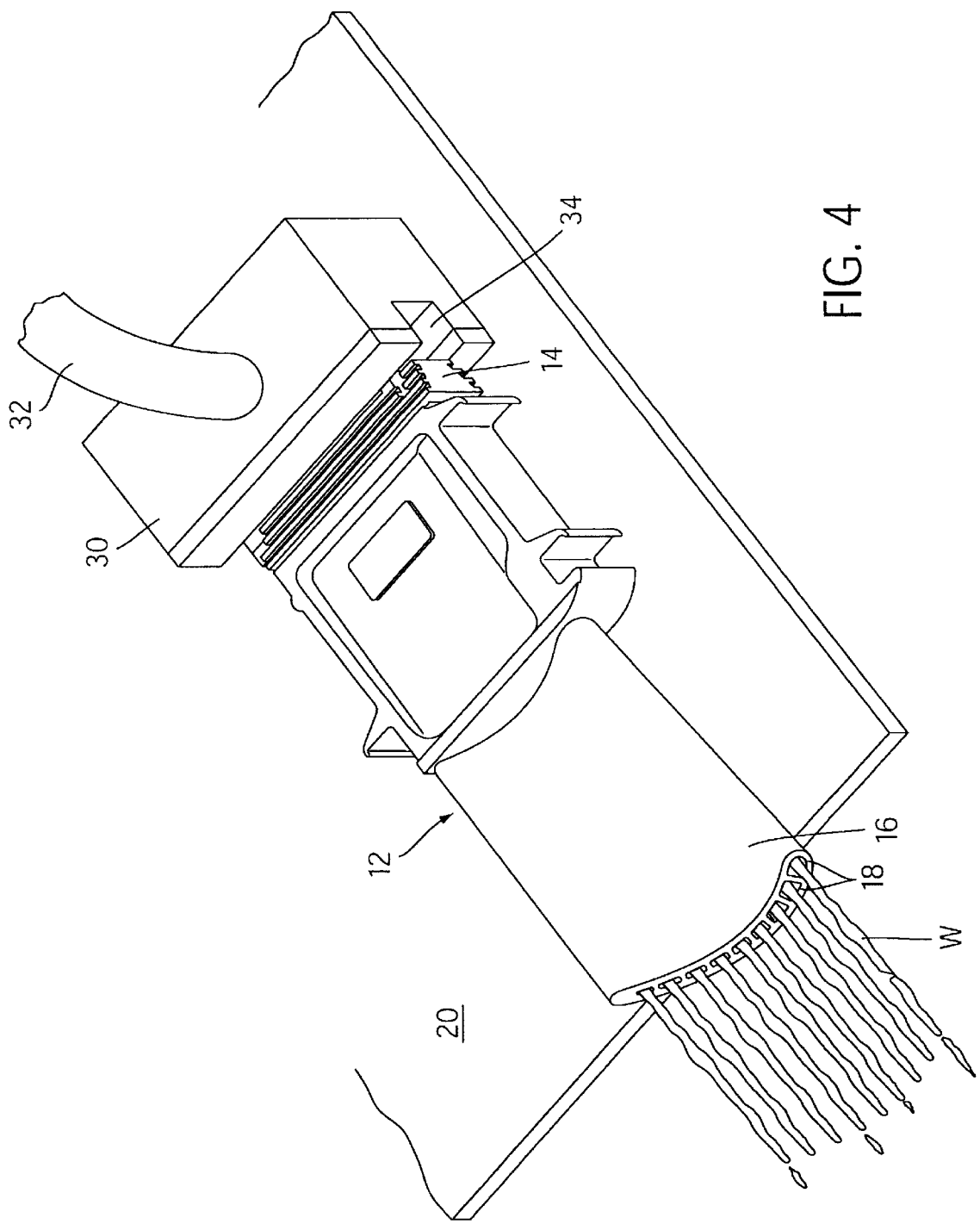
FIG. 4 is a perspective view of a turbine bucket with water flowing out of the tip while being tested.

Once the bucket 12 is in place with its tip 16 extending over the edge of the bench, the water control valve 40 is opened to a predetermined pressure. The manifold control valve 36 is then opened to allow water to flow through the manifold and the cooling passageways 18 of the bucket. Water W should exit the passageways 18 at the tip 16 of the bucket 12, FIG. 4. Any blockage, either partial or total blockage, of any of the passageways due to foreign matter occlusion should be readily observable by the presence or absence of water flow through the passageways. The overall flow data is recorded in the logbook. The recorder is actuated to record the three areas of the flow test as a series of images or a video. A five to ten second recording time is preferred and completes the recorded portion of the test. The recording is then stopped and the counter or other index factor noted in the logbook. The water control valve is closed, and the air control valve is opened to blow out excess water from the bucket. The air control valve is then closed and the manifold control valve is also closed. The bucket is unclamped and removed. The test steps are repeated for each test bucket. A series of buckets can be tested and the tests recorded in this manner. For a set of turbine buckets, it may be desired to video record each of the buckets as they are being inspected, and the entire record stored in memory or a portable medium.

As discussed above, the test video can be displayed on a web page in real time so that a remote viewer can provide immediate real time feedback, and confirm approval of the bucket for delivery. Alternatively, the various storage methods can be used to store the test video for viewing with a time delay. The viewing can occur over the internet as well if the images are uploaded to a web page. The video can also be stored on a portable medium such as a tape or disk which can easily be forwarded to a remote viewer or archived in a library.

Besides visual observation of the water flow through the passageways, the inspection apparatus provides a redundant check on the overall water flow by reading at least one flow meter 42 while the water is coursing through the passageways. The reading can be compared against a theoretical calculated value for overall minimum flow. The calculated value can readily be calculated for specific buckets, and is based on the perimeter of the cooling passageway and its length, the number of passageways and pressure. For example, in a 6B-Stage 1 turbine bucket 12 illustrated in the drawings, the calculated minimum flow would be 2.83 gal/min at 20 psi pressure. If the flow meter reading is less than the calculated minimum overall flow, closer inspection of the bucket is warranted to determine if blockages exist.

The inspection system described herein can be easily adapted for a variety of bucket sizes and necessary pressures on the water supply line where flow testing is required. The inspection system can be used with any article with internal passages which need to be tested for blockages. Alternative manifold blocks may be designed to fit various buckets or other articles with variously shaped and sized passageways. Such variations are contemplated to be within the scope of this invention. Although the illustrated embodiment is described with water as the testing medium, any suitable fluid, such as a colored gas or vapor, which provides visual confirmation of flow through the bucket can be used. For monitor display or video recording purposes it may be necessary to add a dye or other additive to the fluid. It may also be desirable conduct the test under special lighting conditions such as colored lights, black lights or strobe to make the flow test even more visible for clearer recording.

Thus has been described an inspection system for water flow testing the cooling passageways of gas turbine buckets for blockages and video recording of the testing for display on a monitor either locally or remotely. The foregoing explanation includes many variations and embodiments, and the invention is not intended to be limited to the specific details disclosed herein, but only by the claim appended hereto.

What is claimed is:

1. A liquid flow inspection and display system for conducting an inspection for liquid flow testing of passages in turbine buckets for blockages, said system comprising:
   a stationary platform;
   a manifold block having an outlet adapted to affix and seal a turbine bucket thereto, a manifold control valve and a liquid inlet affixed to said platform;
   a liquid supply line coupled to said liquid inlet of said manifold block for supplying liquid under pressure;
   a video camera for monitoring the inspection; and
   a monitor connected to said video camera for displaying a video image of the inspection.

2. The system of claim 1 further comprising a video recorder for recording the video images of the inspection.

3. The system of claim 2 wherein said video recorder records to a video tape.

4. The system of claim 2 wherein said video recorder records to a digital medium.

5. The system of claim 1 further comprising a computer adapted to be connected to a computer network to transmit the video images to other computers for displaying the video images remotely.

6. The system of claim 5 further comprising a video recorder for recording the video images of the inspection and storing same on a storage medium.

7. A system for conducting liquid flow inspection of gas turbine buckets having internal passages comprising:
   an inspection apparatus comprising a stationary platform, a manifold block having an outlet adapted to engage a root end of a turbine bucket, a manifold control valve and a liquid inlet affixed to said platform, and a liquid supply line coupled to said liquid inlet of said manifold block for supplying liquid under pressure through said manifold block and the turbine bucket passages;

a webcam for capturing video images of the inspection;

a monitor connected to said webcam for viewing the video images; and a computer connected to said webcam and adapted to be connected to a computer network for transmitting the video images to another computer on the network for inspection by a remote viewer.

8. The system of claim 7 further comprising a plurality of webcams focused at various areas of said inspection apparatus for capturing video images of the various areas during the inspection.

9. The system of claim 8 further comprising a video splitter connected to said monitor to display multiple video images on said monitor simultaneously in split screen format and enable transmission of the split screen format to another computer on the network.

10. The system of claim 7 further comprising a recording device to record the video images onto a storage medium.

11. The system of claim 10 wherein said storage medium is a video cassette tape.

12. The system of claim 10 wherein said storage medium is a digital disk.

13. The system of claim 10 wherein said storage medium is digital memory in said computer.

14. The system of claim 7 wherein said computer is connected to a web server that receives uploaded video images.

15. The system of claim 14 further comprising a plurality of webcams focused at various areas of said inspection apparatus for capturing video images of the various areas during the inspection.

16. The system of claim 15 wherein one of said webcams is aimed at an area of said inspection apparatus where a turbine blade tip would be disposed during testing.

17. The system of claim 16 wherein one of said webcams is aimed at an area of said inspection apparatus where a turbine blade serial number would be disposed during testing.

18. The system of claim 17 wherein one of said webcams is aimed at a flow meter on said liquid supply line.

19. The system of claim 18 further comprising a video splitter connected to said monitor to display multiple video images on said monitor simultaneously in split screen format and enable transmission of the split screen format to another computer on the network.

20. A method of conducting a video inspection of liquid flow testing of passageways in a turbine bucket for blockages comprising the steps of:

affixing the bucket to a testing apparatus;

sealing the root end of the bucket such that the passageways are in communication with a liquid supply line;

providing liquid flow through the passageways; and capturing video images of the liquid flow through the bucket passageways at the tip to determine whether liquid flow is impeded by blockages; and displaying the video images on a local monitor for visual inspection.

21. The method of claim 20 further comprising the step of transmitting the video images to a remote monitor for real time visual inspection.

22. The method of claim 20 further comprising the step of recording the video images on a storage medium for visual inspection by playback after a time delay.

23. The method of claim 20 wherein said step of capturing video images includes capturing video images of a serial number area of a turbine bucket in place to be tested.

24. The method of claim 20 wherein said step of capturing video images includes capturing video images of a flow meter for the liquid supply line.

25. The method of claim 21 wherein said step of transmitting comprises a web server receiving the video signal and displaying the video images on a web page for remote access and inspection.

26. The method of claim 25 wherein said step of transmitting comprises a web server processing and uploading streaming video to provide remote access to the streaming video.

27. The method of claim 26 further comprising the step of a web server receiving an input from a remote viewer and communicating the input to said computer.

28. A method of providing visual inspection of gas turbine buckets comprising:

affixing a gas turbine bucket to a testing apparatus;

sealing the root end of the bucket so that its internal passageways are in communication with a liquid supply line;

providing liquid flow through the passageways so that liquid flows out of the tip of the bucket and any blockages of the passageways can be ascertained by reduction or absence of liquid flow;

capturing video images of the bucket tip area of the inspection apparatus with a video camera;

displaying the video images on a monitor.

29. The method of claim 28 wherein said step of capturing video images comprises focusing a video camera at an area of the inspection apparatus to capture a bucket serial number.

30. The method of claim 29 wherein said step of capturing video images further comprises focusing a video camera at a flow meter associated with the liquid supply line to capture its reading.

31. The method of claim 30 wherein the step of displaying comprises splitting multiple video images and displaying simultaneously on the monitor.

32. The method of claim 31 further comprising the step of recording the video images onto a storage medium.

33. A method of providing remote visual inspection of gas turbine buckets comprising:

affixing a gas turbine bucket to a testing apparatus;

sealing the root end of the bucket so that its internal passageways are in communication with a liquid supply line;

providing liquid flow through the passageways so that liquid flows out of the tip of the bucket and any blockages of the passageways can be ascertained by reduction or absence of liquid flow;

capturing video images of the bucket tip area of the inspection apparatus with a video camera;

processing the video images into streaming video;

uploading the streaming video to a web server enabling remote viewing and inspection.

34. The method of claim 33 further comprising the step of receiving input about the inspection from the remote viewer.

35. The method of claim 33 wherein said steps of uploading and remote viewing are performed in real time.

36. The method of claim 33 wherein said step of uploading the streaming video to a web server includes the step of storing the streaming video for later remote viewing.

37. The method of claim 36 wherein said step of storing comprises storing the streaming video as a data file on a recording medium.

38. The method of claim 36 wherein said step of storing comprises storing the streaming video on a web server.

* * * * *